United States Patent [19]

Lawrence et al.

[11] Patent Number: 4,624,039

[45] Date of Patent: Nov. 25, 1986

[54] UNIVERSAL SUSPENSION TOOL

[76] Inventors: Manuel Lawrence, 32 Lanovette St., Meriden, Conn. 06450; Alfred Gonsalves, Evergreen La., Prospect, Conn. 06712

[21] Appl. No.: 769,687

[22] Filed: Aug. 27, 1985

[51] Int. Cl.[4] .............................................. B23P 19/04

[52] U.S. Cl. ...................................................... 29/257

[58] Field of Search .......................... 29/257, 256, 253

[56] References Cited

U.S. PATENT DOCUMENTS

| | | | |
|---|---|---|---|
| 837,577 | 12/1906 | Loud | 29/257 |
| 848,252 | 3/1907 | Kitterman | 29/257 |
| 1,344,700 | 6/1920 | Loomis | 29/257 |
| 1,365,559 | 1/1921 | Starks | 29/257 |
| 1,373,017 | 3/1921 | Nichols | 29/257 |
| 1,498,638 | 6/1924 | Periolat | 29/257 |
| 2,075,792 | 4/1937 | Curtiss | 29/257 |
| 3,307,250 | 3/1967 | Goodwin et al. | 29/257 |

*Primary Examiner*—Robert C. Watson
*Attorney, Agent, or Firm*—Lawrence Hager

[57] ABSTRACT

A ball joint and/or tie-rod tool having a multiple of attachment members and being configured to facilitate the removal or separation and installation of a number of different types and size ball-and-socket or press fitted couplings such as, for example, ball joints and tie-rod members, as utilized in the front-end assembly and steering control of automobiles, trucks and the like. The multi-purpose or universal tool, generally speaking, comprises a hand held universal suspension press, a pressure bolt means, a plurality of ball joint and/or tie-rod attachment fork members, one or more arbor press attachment members, and other attachment parts to facilitate ball joint and tie-rod joint removal/installation.

1 Claim, 9 Drawing Figures

UNIVERSAL SUSPENSION TOOL

FIELD OF THE INVENTION

The present invention relates to a means for facilitating the removal and installation of force fitted type joints and, more particularly, to a multi-purpose, multi-functional tool device to facilitate the removal/installation and/or separation of ball joints as utilized in front end suspensions and steering control systems on automobiles, trucks and the like.

BACKGROUND OF THE INVENTION

Hitherto, the tapered stud portion of a ball joint coupling was typically separated from the spindle collar by use of a hammer and wedge to bang apart the spindle and ball joint.

A dedicated or special arbor press tool such as is shown in U.S. Pat. No. 3,862,483 could be used to remove and insert the ball and socket joint assembly from or in the receiving hole of the A-frame of the vehicle front suspension. A serious disadvantage of this tool is that it is designed for use on a Volkswagen vehicle and has a limited purpose, i.e., to remove and install press-in type ball joints on the A-frame member of one type vehicle.

Other special and, therefore, limited function ball joint press or arbor press tools are shown.

Other prior art patent references of interest include U.S. Pat. Nos. 298,903 issued May 20, 1884 to A. R. Seaman; 3,266,134 issued Aug. 16, 1966 to M. A. Moskovity; 2,235,643 issued Mar. 18, 1941 to E. M. Pfauser; 1,866,125 issued July 5, 1932 to J. O. Patterson; 1,352,098 issued Sept. 7, 1920 to J. H. Staley; and 1,945,476 issued Jan. 30, 1934 to J. Y. Blayek et al.

These patents are mentioned as being representative of the prior art and other pertinent references may exist. None of the above cited patents are deemed to affect the patentability of the present claimed invention.

The present invention involves a novel combination of features combined in such a way as to afford a solution to the difficulties, disadvantages and limitations of the prior art devices.

For example, in total contrast to the prior art, the present invention provides a multi-purpose and generally universal hand held type tool having particular utility for; (A) separating ball joints from a spindle; (B) separating tie-rod couplings; (C) extracting bushings from the upper and lower A-frames; (D) bushing installation; and a plurality of attachment members or parts to accommodate and facilitate front suspension work on several if not all standard automobiles and trucks. The present invention also provides a tool having a robust structure, which enables manipulation and varied arrangement of a plurality of attachment members and is adapted for ease of use while working on the vehicle.

SUMMARY OF THE INVENTION

Generally speaking, and in accordance with the invention, a multi-functional universal front and rear suspension tool is provided having particular utility for removing and/or installing ball joints and/or upper and lower control arm brushings, comprising;

a suspension press means (11); and a first pair of prong or fork means (13) adapted for being operatively engaged with said suspension press means;

whereby with actuation of said suspension press means said fork means may be caused to wedgingly effect loosening or separation of a spindle (83) from a ball joint stud or ball stud (82).

Another attachment means (14) may be provided to facilitate the separation of tie-rod couplings.

Another attachment means (15, 16, 17, 18) may be provided to facilitate bushing extraction.

Another attachment means (15, 16, 17, 18, 20, 21) may be provided to facilitate bushing installation.

Another attachment means (22) may be provided to support portions of the control arm during ball joint and/or bushing removal and installation.

Accordingly, it is an object of the present invention to provide a new and improved tool.

It is a further object of the present invention to provide a new and improved ball joint separator tool.

It is a further object of the present invention to provide a new and improved tie-rod separator tool.

It is a further object of the present invention to provide a new and improved bushing extractor tool.

It is a further object of the present invention to provide a new and improved ball joint extractor tool.

It is a further object of the present invention to provide a new tool for removing and installing upper control arm brushings.

It is a further object of the present invention to provide a new and improved tool for installing ball joints.

It is a further object of the present invention to provide a new and improved ball joint tool that requires a relatively small amount of physical effort and strength to effect separation of a spindle and a ball stud.

It is a further object of the present invention to provide a new and improved tool that requires a relatively small amount of physical effort and strength to effect removal and installation of ball joints from a contol arm assembly.

It is a further object of the present invention to provide a multi-attachment tool having utility for removing and installing ball joints on several different types of automobiles.

BRIEF DESCRIPTION OF THE DRAWINGS

Other objects and advantages of the present invention will be evident from the following detailed description when read in conjunction with the accompanying drawings which illustrate the preferred embodiment of the present invention. Similar reference numerals refer to similar parts throughout.

DESCRIPTION OF THE PREFERRED EMBODIMENT

Figure 1:
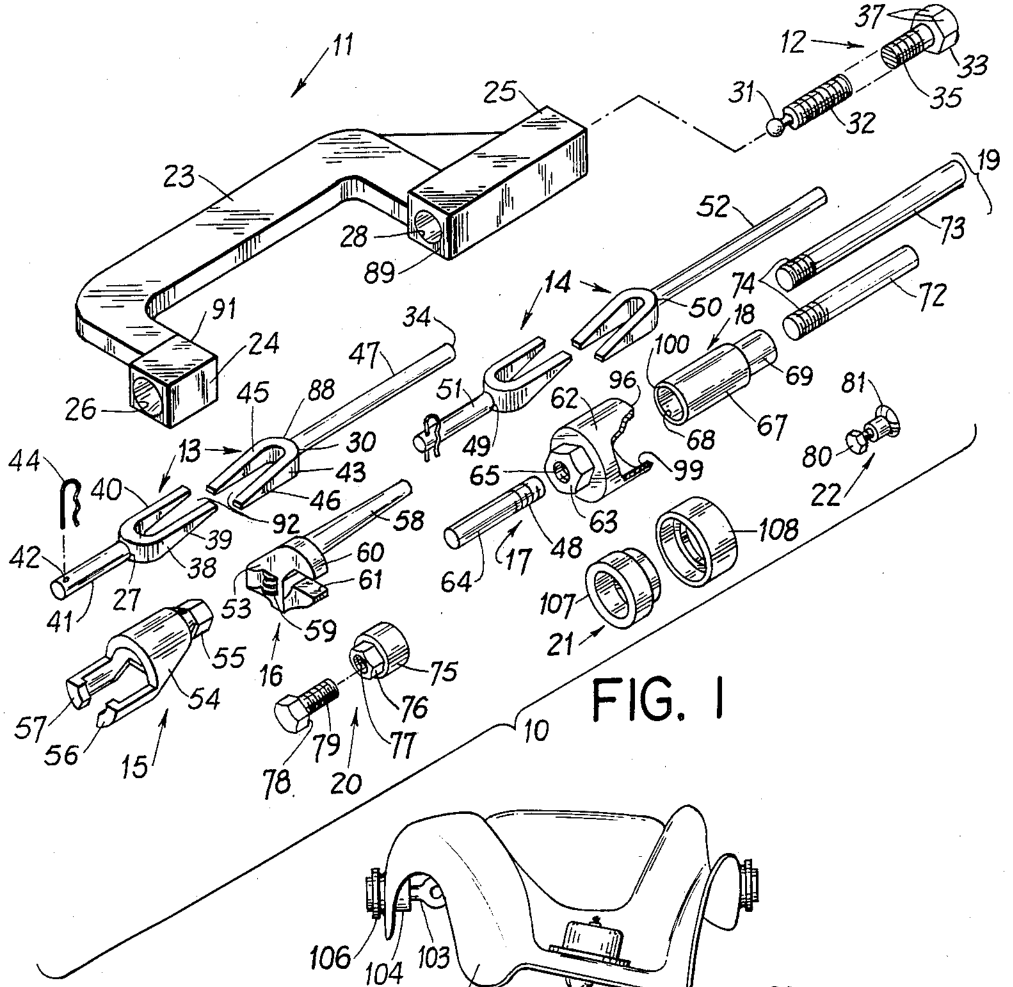
FIG. 1 is an exploded view of the ball joint and/or tie-rod tool with several alternative attachments in accordance with the invention.

Reference will now be made to the drawings and, in particular, to FIG. 1 in which there is shown an exploded view of the ball joint and tie-rod tool 10 according to the invention. Basically speaking, the ball joint and tie-rod tool 10 comprises a (universal) suspension press 11, a pressure or pusher bolt 12, a pair of ball joint separating forks or bifurcated wedges 13, a pair of tie-rod forks or bifurcated wedges 14, and upper control arm bushing receiver 15, an upper control arm bushing extracting member 16, a ball joint and bushing receiver 17, a ball joint and bushing pusher 18, a plurality of pusher extension bars 19, lower and upper control arm bushing installer 20, a plurality of different sized bushing installer attachments 21 and an adjustable lower control arm spacer 22. The constituent attachments or parts of the ball joint and tie-rod tool 10 may be constructed of any suitable material such as steel.

The suspension press 11 generally comprises a C-clamp shaped body member 23 having at one end a first rod mounting socket 24 and at its other end a second rod mounting socket 25. First rod mounting socket 24 has a rod receiving hole 26, which may be dimensioned and/or contoured, i.e., conically (see FIG. 2), to enable manipulation of ball joint separation fork 27 as will be discussed in greater detail hereinafter. Second rod mounting socket 25 has an elongate rectangular configuration with a rod receiving hole 28 which extends longitudinally approximately halfway into second rod mounting socket 25 (see FIG. 3). The other end of second rod mounting socket 25 has a pusher bolt receiving hole 29 having internal or female threads 36. Rod receiving hole 28 may be dimensioned or contoured to enable manipulation of ball joint separating fork 30 as will be described in greater detail hereinafter.

Pusher bolt 12 comprises a knob shaped pusher head 31 at one end, an intermediate portion 32, and at its other end a bolt head member 33. Pusher head 31 is configured for engaging an end portion 34 of ball joint separating fork 30, with pusher bolt 12 being inserted into hole 30. Intermediate portion 32 contains external or male threads 35 dimensioned for being matingly received by female threads 36. Bolt head member 33 has a plurality of flat portions 37 for being engaged by a wrench or socket means (not shown) or the like for screwing and unscrewing pusher bolt 12 into and out of hole 29 to selectively dispose pusher head 31 longitudinally within hole 29 and/or hole 28. It should be appreciated at this time that a pneumatic wrench or other power tool having a suitable socket may be utilized to screw and unscrew pusher bolt 12.

As noted above, the pair of ball joint separating forks 13 comprises a first and a second fork attachment 27 and 30. Each fork attachment includes a bifurcated wedge member 38, 43. Bifurcated wedge member 38 generally includes an inclined surface portion 39 and flat surface portion 40. Ball joint separating fork 27 includes a shaft 41 with a cotter type pin receiving hole 42. Shaft 41 is dimensioned for being received within hole 26, while enabling rotation and slight tilt manipulation thereof to facilitate placement of wedge member 38 about, for example, a spindle (see FIG. 2). A locking pin 44 may be used to secure fork attachment 27 to mounting socket 24. Bifurcated wedge member 43 also includes an inclined surface portion 45 and a flat surface portion 46. Fork attachment 30 includes a round shaft 47 dimensioned for being inserted into hole 28 and/or hole 29. The end portion 34 of shaft 47 may include a socket or indent or detent dimensioned for being engaged by pusher head 31.

The set of tie-rod attachments 14 includes a first and a second fork shaped wedge tool 49 and 50 each having a shaft 51 and 52, respectively. Each said tie-rod tool 49 and 50 is configured substantially similar to fork tool attachments 27 and 30, respectively, except that tie-rod tools 49 and 50 are dimensioned to facilitate tie-rod removal or coupling separation (not shown).

Upper control arm receiver member 15 comprises a body portion 54, a nut shaped end portion 55 and off-set bifurcated bracing member 56 and 57. Nut end portion 55 has an opening with female threads (not shown) for receiving the threaded end portion of a pusher extension bar 19. Bracing members 56 and 57 are spaced apart and off-set to enable disposition about a bushing (see FIGS. 5 and 6) to facilitate extraction and installation control arm bushings.

Bushing extractor member 16 comprises an adjustable wrench head member 53 and an elongate shaft or rod portion 58. Wrench head member 53 includes a thumb wheel adjustment nut 59, a fixed gripper arm 60 and an adjustable gripper arm 61 the disposition of which being controlled by adjustment nut 59.

Ball joint and lower bushing receiver member 17 comprises a cup shaped collar member 62 having a nut portion 63, and a mounting rod 64. Nut portion 63 has an opening 65 with internal or female threads adapted for receiving the male threaded end portion 48 of mounting rod 64. The other end of mounting rod 64 is dimensioned for being insertable within hole 26 of mounting socket 24 and/or hole 28.

Ball joint and bushing pusher 18 comprises an elongate collar 67 having an opening 68 and a rod mounting collar 69. Rod mounting collar 69 is of smaller diameter than collar 67, and has an opening 70 with female threads 71 (see FIG. 3).

Pusher extension bars 19 comprises a plurality of discrete pusher bars 72 and 73 of different length. Each pusher bar 72 and 73 has an end portion with male threads 74 for being received by the female threads 71 of bushing collar 18 and/or the female threads of opening 65 in collar member 62.

Lower and upper control arm bushing installer member 20 comprises a collar 75 having a nut shaped portion 76 with a hole 77 containing female threads, and a bolt means 78 having male threads 79 for being received by the female threads of nut portion 76.

A plurality of different sized bushing installer attachment parts 21 may be provided to accommodate different sized bushings.

Adjustable lower control arm separator 22 generally comprises a threaded bolt like member 80 and a spacer collar 81.

OPERATION

The operation, use and function of the universal suspension tool 10 will now be discussed in greater detail.

Figure 2:
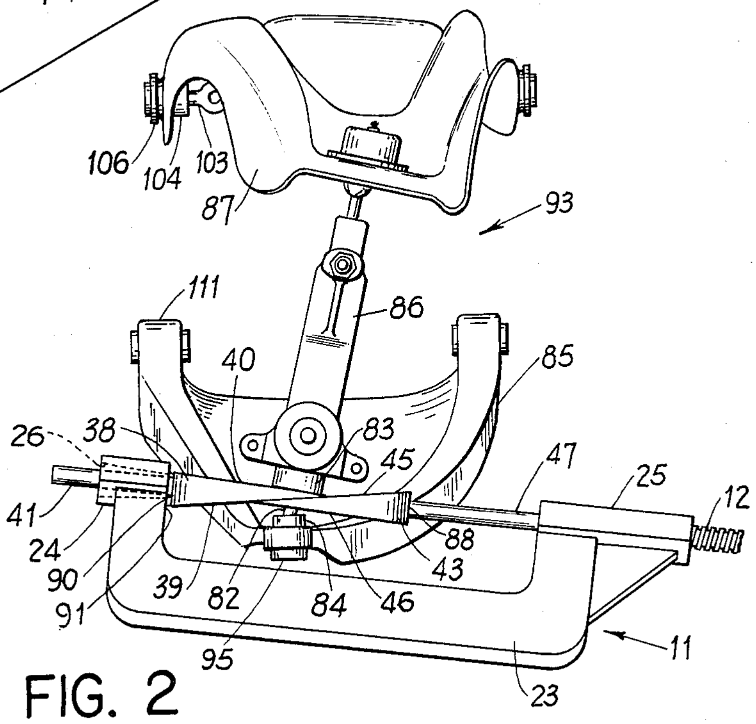
FIG. 2 is a plan view of one combination of attachments to facilitate separation of the ball joint tapered stud from the spindle in accordance with the invention.

With reference to FIG. 2, a first embodiment-arrangement of the ball joint and tie-rod tool 10 is illustrated operatively positioned for separating or loosening a ball joint stud 82 from a spindle collar 83. Ball joint 84 is shown mounted on a lower A-frame 85, which is mounted to the front end of, for example, an automobile (not shown). The spindle 86 is connected between the upper A-frame 87 and lower A-frame 85.

With fork attachments 27 and 30 mounted in mounting socket 24 and 25, respectively, and pusher bolt 12 screwed counter-clockwise, fork attachments 27 and 30 may be spaced apart (not shown) to effect a spacing between the ends of wedges 38 and 43. This can be appreciated by understanding that rear wall 88 of wedge 43 may be disposed rearwardly to abut wall 89 of mounting socket 25 with rear wall 90 of wedge 27 abutting wall 91 of mounting socket 24. In this spaced disposition, ball joint and tie-rod tool 10 may be placed in position for aligning the diametrically opposed wedges 27 and 30 with the gap or separation between spindle collar 83 and ball joint 84. With clockwise rotation of head member 33, pusher head 31 engages end 34 of rod 47 causing wedge 43 to be urged inwardly toward edge 38. With continued rotation of head member 33, the inclined surfaces 39 and 45 of wedges 38 and 43, respectively, slidingly engage while flat surface 40 engages spindle collar 83 and flat surface 46 engages ball joint 84. The inward urging of wedge 43 is sliding engagement with wedge 38 causes the flat surfaces 40 and 46 to be increasingly spaced further apart, which in-turn causes spindle collar 83 to be urged upwardly and ball joint 84 to be urged downwardly. This opposite urging of spindle collar 83 and ball joint 84 results in separating or loosening the ball joint stud 82 from the spindle collar or coupling 83.

It should be noted at this time that shaft 41 and 47 are rotatable and slightly manipulatable, i.e., rockable from side-to-side and up-and-down, to facilitate placement of the forks with fork openings 92 being aligned, for example, with stud 82. Thus, the present invention provides a hand tool to enable work on the front-end 93 of a vehicle (not shown) without removal of the assembly, i.e., A-frames 85 and 87, tie-rod, spindle 86 etc., to a work bench, while substantially reducing the physical effort hitherto required to perform many front-end repairs. Illustration of the vehicle and/or complete front-end assembly has been omitted to avoid confusing complexity.

Figure 3:
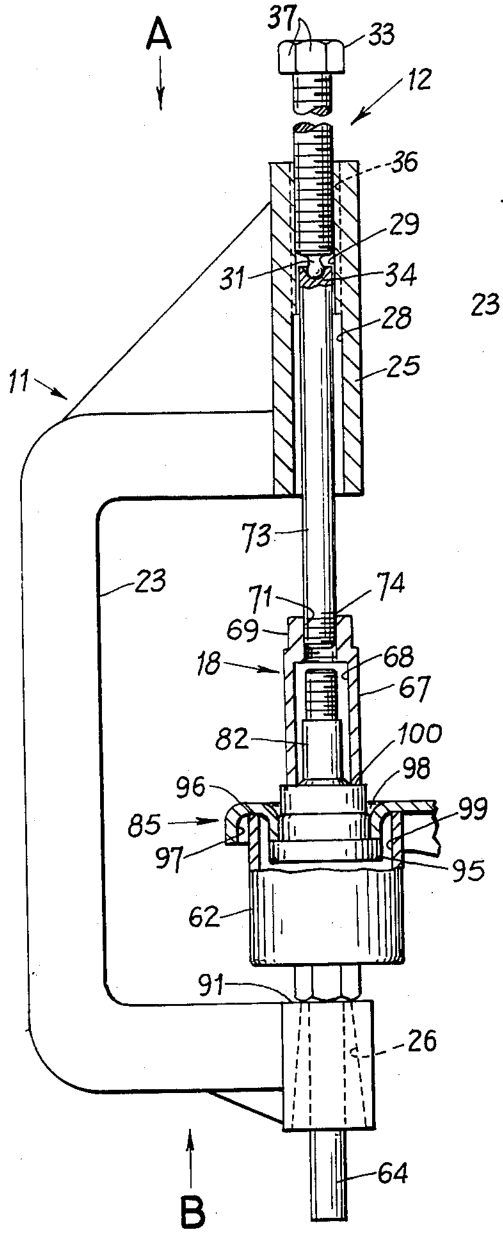
FIG. 3 is a plan view, partly cutaway, of another combination of attachments being utilized for extracting a ball joint from an A-frame in accordance with the invention.

With reference now to FIG. 3, a cutaway illustration is provided of another arrangement of the attachment parts of tool 10, when utilized for effecting or facilitating removal of ball joint 84 from A-frame 85. Ball joint and bushing receiver 17 is mounted to mounting socket 24, with rod 64 being within tapered hole 26. Ball joint and bushing pusher 18 and affixed pusher bar 73 are mounted to socket 25, with pusher bar 73 being inserted within hole 28. With spindle 86 disposed out of the way, i.e., held or placed with spindle collar 83 distal from stud 82, ball joint receiver 62 is placed over ball joint member 95. In this manner, peripheral rim 96 abuts A-frame interior wall 97 about aperture 98, and receiver cavity 99 is positioned such that rim 100 of collar 67 abuts ball joint member 84 with stud 82 being received within aperture 70 of collar 67. With manual or power tool (now shown) actuation of nut head 33, shaft 73 and pusher 18 and, therefore, ball joint 84 are urged in the direction of arrow A. This actuation is continued until ball joint 84 is dislodged form the force-fit within aperture 98. Next, nut head 33 may then be actuated to enable manual disposition of shaft 73 and pusher 18 rearwardly, i.e., oppositely to arrow A, and removal of ball joint 84 from A-frame 85.

Figure 4:
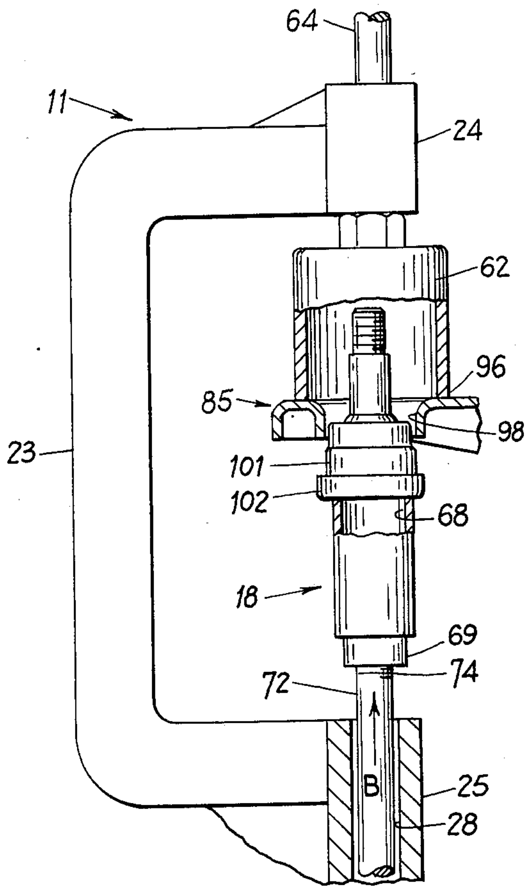
FIG. 4 is a plan view, partly cutaway, of another combination of attachments being utilized for installing a ball joint in an A-frame in accordance with the invention.

With reference to FIG. 4, the ball joint receiver 62 and pusher 18 are illustrated being utilized to facilitate the installation of a new or replacement ball joint 101. In this arrangement, pusher 18 and shaft 72 are mounted to socket 25, and receiver 62 with its affixed shaft 64 are mounted to socket 24. Rim 100 of pusher 18 is abutted against ball joint cap 102 while receiver 62 is located about A-frame opening 98 and with its rim 96 abutting A-frame 85. With actuation of pusher bolt 12, pusher 18 urges ball joint 101 into force fit within opening 98 of A-frame 85. In this manner, a new or replacement ball joint may be relatively easily installed on an A-frame 85 without dismantling the A-frame 85 from the vehicle.

Figure 6:
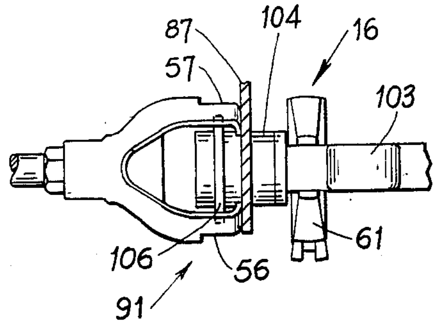
FIG. 6 is another plan view, partly cutaway, of the bushing extractor attachment shown in FIG. 5.
Figure 5:
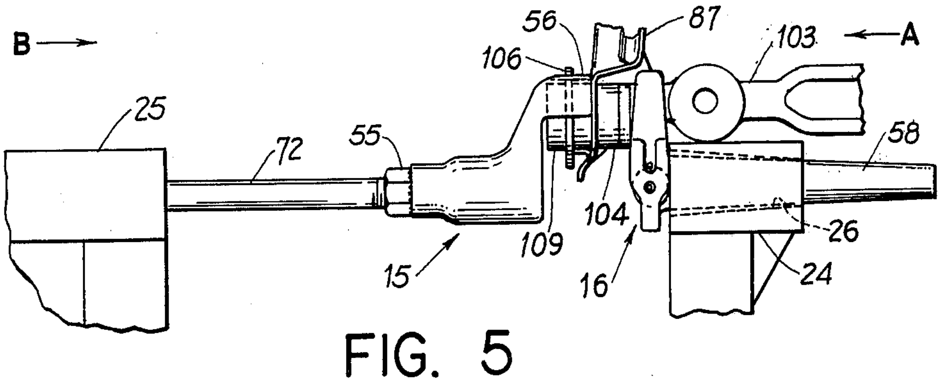
FIG. 5 is a plan view of another combination of attachments being utilized for extracting a bushing from an upper control arm in accordance with the invention.

With reference now to FIGS. 5 and 6, an alternative arrangement/embodiment/assembly 91 of tool 10 is shown. In this arrangement, upper control arm receiver 15 with pusher bar 72, affixed to threaded nut portion 55 of receiver 15, is mounted to socket 25. Adjustable extracting member 16 is mounted to socket 24 of suspension press 11, with shaft 58 being positioned within aperture 28. Head 53 of extractor 16 with shaft 58 is supported or abutted against socket 24. Gripper arms 60 and 61 are positioned about upper control arm shaft 102 and abutting bushing member 104 (see also FIG. 2). Bracing members 56 and 57 are abutted with A-frame 87 and about bushing collar 106. With manual actuation of pusher bolt 12 (not shown), bushing extractor 16 is urged in the direction of arrow B against A-frame 87, which results in extractor 16 being pulled in the direction of arrow A, thereby, forcing bushing 104 out of its seated position within the upper A-frame 87 bushing aperture.

Figure 7:
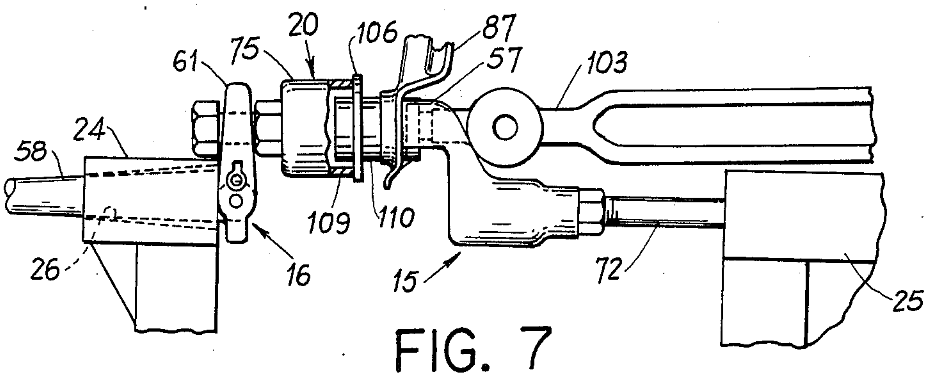
FIG. 7 is a plan view of another combination of attachments being utilized for installing an upper control arm bushing in accordance with the invention.

With reference now to FIG. 7, another arrangement of tool 10 attachment parts is illustrated. In this arrangement, upper control arm receiver 15 with an extension bar 72 affixed thereto is mounted within hole 28 of socket 25. The off-set spaced apart bracing members 56 and 57 are positioned about upper control arm shaft 103 and abutting A-frame 87. Bolt 76 is screwed into hole 77 forming a bushing installer 20. It being understood that the correct sized bushing installer collar 75, 107 or 108 is selected for the particular vehicle being worked on. Bushing installer 20 is then mounted or affixed between arms 60 and 61 of extractor tool 16. Extractor tool 16 is mounted within socket 24 as shown. Bushing installer collar 75 (or 107 or 108) is positioned about bushing cap 109 and abutting bushing collar 106. With manual or power tool actuation of pusher bolt 12 (not shown), off-set receiver 15 is urged against A-frame 87 causing bushing installer collar 75 (or 107 or 108) to be urged toward A-frame 87, thereby inserting bushing member 110 into the bushing hole in A-frame 87.

Figure 8:
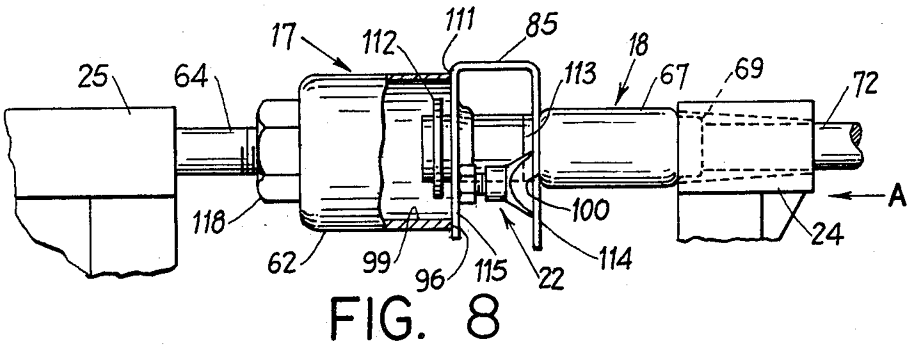
FIG. 8 is a plan view of another combination of attachments being utilized for extracting a lower control arm bushing in accordance with this invention.

With reference now to FIG. 8, the operation of extracting a bushing from a lower control arm or A-frame 85 will now be discussed. Ball joint and bushing receiver 17 is mounted to socket 25, with shaft 64 being operatively received within hole 28. Ball joint and bushing pusher 18 with affixed shaft, for example, shaft 72, is mounted to socket 24, with collar 67 abutting ridge 89 of socket 24. Bushing receiver collar 62 is positioned such that its rim 96 abuts the lower control arm 111 portion of A-frame 85, with bushing cap 112 being received within cavity 99. Bushing pusher 18 is positioned such that its rim 100 abuts inner bushing collar 113. Adjustable lower control arm separator or spacer 22 is inserted between the ledges or spaced apart wall members 114 and 115 of control arm 111 to substantially prevent bending or deforming of these wall members 114 and 115 with actuation of tool 10. With manual or automatic actuation of pusher bolt 12 (not shown), collar 62 is urged inwardly against wall member 115. This causes socket 24 and, therefore, pusher collar 18 to be urged in the direction of arrow A, which, in-turn, pushes bushing body member 113 in the direction of arrow A and out of its force fitted seat within the aligned bushing receiving holes in walls 114 and 115.

Figure 9:
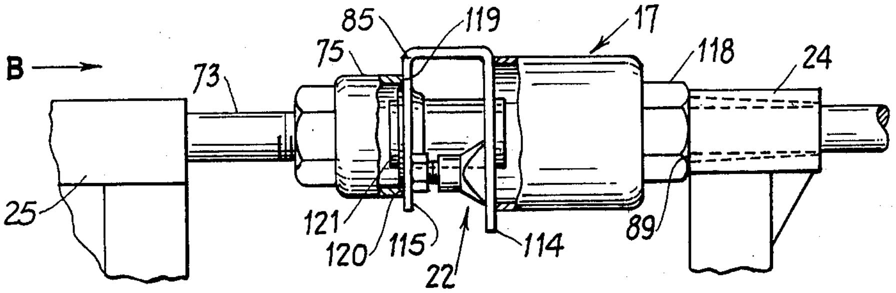
FIG. 9 is a plan view of yet another combination of attachments being utilized for installing a control arm bushing in accordance with the invention.

With reference now to FIG. 9, another arrangement of tool 10 attachments is shown. The operation and multi-functional features of this arrangement for the installation of lower control arm 111 bushings will now be described. Bushing receiver 17 is now mounted to socket 24 with nut 118 abutting wall 89 of socket 24. Bushing installer, for example, collar 75 with pusher bar 73 affixed to nut 76, is mounted to socket 25 with bar 73 being received within hole 28 (not shown). The peripheral rim 119 of collar 75 abuts the peripheral retaining or stopper ledge 120 of bushing 121. It being understood that bushing 121 was first hand inserted within the bushing receiving apertures (not shown) within walls 114 and 115. With actuation of pusher bolt 12 (not shown), rod 73 and collar 75 are urged inwardly in the direction of arrow B, thereby, urging bushing body portion 122 into a force fit within the bushing receiving apertures within walls 114 and 115.

It should be now recognized that the operation and function of tool 10 is to facilitate the freeing or loosening of bushings and/or ball joint-spindle force fitted or frozen couplings, and to facilitate the installation of ball joints and bushings with relative ease and quickness while working on a front-end of a vehicle. Another feature of tool 10 is to enable relatively easy and quick separation of tie-rod couplings.

It should also be recognized that the universal suspension tool 10 in accordance with the invention may be utilized for removing and/or installing brushings on the rear control arms.

While the invention has been described with respect to the preferred embodiment(s), it should be apparent to those skilled in the art that numerous modifications may be made thereto without departing from the spirit and scope of the invention.

I claim:

1. A front suspension tool having particular utility for facilitating the removal and/or installing of ball joints, tie-rods and bushings, comprising:

a suspension press means (11) having a first mounting socket (24) and a second mounting socket (25), said first mounting socket having a tapered hole (26), said second mounting socket having an elongate hole (28) and threaded wall portions (36) defining a portion of said elongate hole (28);

pusher bolt means (12) having a bolt head (33), an intermediate portion (32) having threads (36) for matingly engaging said threaded wall portions of said second mounting socket, and having a pusher head member (31);

first interchangeable attachment means (27) having a bifurcated wedge member (38) with an inclined surface portion (39) and a flat surface portion (40), and having an elongate shaft (41), said elongate shaft being dimensioned for being insertable within said first socket hole (26) and within said second socket hole (28);

second interchangeable attachment means (30) having a bifurcated wedge member (43) with an inclined surface portion (45) and a flat surface portion (46), and having an elongate shaft (47), said elongate shaft being dimensioned for being insertable within said first socket hole (26) and within said second socket hole (28);

third interchangeable attachment means (15) having a body portion (54), and having a pair of spaced apart off-set bracing members (56,57), and having an elongate shaft means (72) dimensioned for being insertable within said first socket hole (26) and within said second socket hole (28);

fourth interchangeable attachment means (16) having an adjustable wrench head member (53) and an elongate shaft (58), said head member (53) having a thumb wheel adjustment means (59) and a fixed gripper arm (60) and an adjustable gripper arm (61) being movable with actuation of said adjustment means (59), said elongate shaft (58) being dimensioned for being insertable within said first socket hole (26) and within said second socket hole (28);

fifth interchangeable attachment means (17) having a collar member (62) defining a cavity (99) and having a shaft member (64) dimensioned for being within said first socket hole (26) and within said second socket hole (28);

sixth interchangeable attachment means (18) having a collar (67) and an elongate shaft, said elongate shaft being dimensioned for being insertable within said first socket hole (26) and within said second socket hole (28);

seventh interchangeable attachment means (20) having a collar (75) and a shaft member dimensioned for being mountable between said fixed gripper arm (60) and said adjustable gripper arm (61); and eighth interchangeable attachment means (22) having a spacer collar (81) and an adjustment means (80);

such that each of said attachment means (27,30,15,16,17,18,20,22) being selectively demountably mounted to said suspension press means.

* * * * *